UNITED STATES PATENT OFFICE.

EMIL MEYER, OF BERLIN, GERMANY.

PROCESS OF DISINTEGRATING THOMAS SLAG.

SPECIFICATION forming part of Letters Patent No. 550,024, dated November 19, 1895.

Application filed January 2, 1895. Serial No. 533,674. (No specimens.)

*To all whom it may concern:*

Be it known that I, EMIL MEYER, a subject of the King of Prussia, German Emperor, and a resident of Berlin, in the Kingdom of Prussia, German Empire, have invented a certain new and useful Improved Process of Disintegrating Thomas Slag, of which the following is a full, clear, and exact description.

The object of the present invention is to facilitate the reduction or disintegration of Thomas slag, and particularly of the harder kinds of slag.

The present process is carried out in the following manner: To the fluid Thomas slag is added a small quantity of alkaline carbonate, either directly or while casting from the converter, the said carbonate dissolving evenly in the mass and exercising a very favorable effect on the reduction or disintegration of the slag. Alkaline silicate may be employed in the same manner, the effect in this case being still more marked, the silicate being less volatile and acting more powerfully on the lime. Thus an addition of five to fifteen per cent. of silicate of sodium (water-glass), which, according to its more or less alkaline nature, entirely dissolves in the fluid-slag, will produce a very favorable result.

The effect of the alkaline silicate is still further enhanced if substances are mixed with the same which combine easily with oxygen and thus convert the more highly oxidized combinations contained in the slag, particularly ferric oxid, into ferrous oxid combinations. Coke-powder or metallic sulfids, particularly white iron pyrites or sulfid of sodium, which latter often forms an impurity of water-glass, are well suited for the purpose. The amount of these substances added should be about eight to twenty per cent. of the amount of the metallic iron dissolved in the slag in the form of ferric oxid. The sulfur in these reducing agents combines with the lime in the fluid slag, the carbon escaping as carbonic oxid. The heat produced by this combustion increases the action of the chemical combination.

I claim as my invention—

1. A process for facilitating the disintegration of Thomas slag, consisting in introducing into the same while in a fluid state, an alkaline disintegrating agent, such as alkaline carbonate, or alkaline silicate, in the manner and for the purpose substantially as described.

2. A process for facilitating the disintegration of Thomas slag, consisting in first introducing into the same while in a fluid state, an alkaline disintegrating agent, such as alkaline silicate, or alkaline carbonate, and then adding further a reducing powder to the same, such as coke powder, or metallic sulfid, substantially as described.

In witness whereof I have hereunto set my hand in presence of two witnesses.

EMIL MEYER.

Witnesses:
 WM. HAUPT,
 CHAS. KRÜGER.